United States Patent
Komori et al.

(10) Patent No.: US 6,403,690 B1
(45) Date of Patent: Jun. 11, 2002

(54) FLAME RETARDANT RESIN COMPOSITION

(75) Inventors: Kiyotaka Komori, Hirakata; Keiko Kashihara, Ibaraki; Kenji Ogasawara, Hirakata; Akiyoshi Nozue; Shigehiro Okada, both of Yokkaichi, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/450,659

(22) Filed: Nov. 30, 1999

(30) Foreign Application Priority Data

Jun. 9, 1999 (JP) .......................... 11-163146

(51) Int. Cl.⁷ .............................. C08K 3/10; C08F 8/40
(52) U.S. Cl. .................. 524/436; 523/433; 523/435; 523/451; 526/275; 524/114; 524/117; 525/340
(58) Field of Search .................. 524/114, 117, 524/436; 523/506, 435, 451, 433; 528/158, 167, 398; 526/193, 275; 525/340

(56) References Cited

U.S. PATENT DOCUMENTS

| | | | | |
|---|---|---|---|---|
| 3,702,878 A | * | 11/1972 | Saito et al. .................. | 524/117 |
| 4,198,492 A | * | 4/1980 | Izawa et al. ................. | 524/117 |
| 4,882,227 A | * | 11/1989 | Iwase et al. ................. | 524/117 |
| 4,940,772 A | * | 7/1990 | Matsumoto et al. ........ | 523/506 |
| 5,804,621 A | * | 9/1998 | Kimura et al. .............. | 524/117 |
| 5,872,169 A | * | 2/1999 | Elsner et al. ................ | 524/436 |

FOREIGN PATENT DOCUMENTS

| | | | | |
|---|---|---|---|---|
| DE | 19824193 A | | 12/1998 | |
| EP | 0378315 A | | 7/1990 | |
| JP | 57-205418 | * | 12/1982 | .................. 523/117 |
| JP | 59-22938 | * | 2/1984 | .................. 523/117 |
| JP | 61-106657 | * | 5/1986 | .................. 524/117 |
| JP | 61-266614 | * | 11/1986 | .................. 524/117 |
| JP | 62-70414 | * | 3/1987 | .................. 523/451 |
| JP | 63-8451 | * | 1/1988 | .................. 524/117 |
| JP | 63-150352 | * | 6/1988 | .................. 523/117 |
| JP | 1-141943 | * | 6/1989 | .................. 523/117 |
| JP | 3-124744 | * | 5/1991 | .................. 524/117 |
| JP | 4-370113 | * | 12/1992 | .................. 523/117 |

OTHER PUBLICATIONS

Chun–Shan Wang et al., Synthesis and Properties of Epoxy Resin Containing 2–(6–oxid–6H–dibenz<c,e><1,2>oxaphosphorin–6–yl)1,4–benzenediol, Polymer, vol. 39, No. 23, Nov. 1, 1998, pp. 5819–5826.

Ching–Sheng Cho et al., aryl Phosphinate Anhydride Curing for Flame Retardant Epoxy Networks, Chemical Abstracts, vol. 130, No. 4, Jan. 25, 1999, pp. 203–209.

* cited by examiner

*Primary Examiner*—Veronica P. Hoke
(74) *Attorney, Agent, or Firm*—Birch, Stewart, Kolasch & Birch, LLP

(57) ABSTRACT

A halogen-free flame retardant resin composition comprising a radically polymerizable resin which is modified with a phosphorus-containing compound of the formula (1):

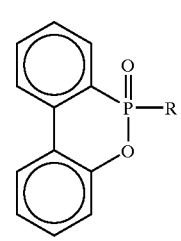

(1)

in which R is a hydrogen atom or a group of the formula: $-(CH_2)_n-R_1$ in that $R_1$ is a group derived from a compound having at least two phenolic hydroxyl groups or epoxy groups, and n is an integer of 0 to 3.

12 Claims, 1 Drawing Sheet

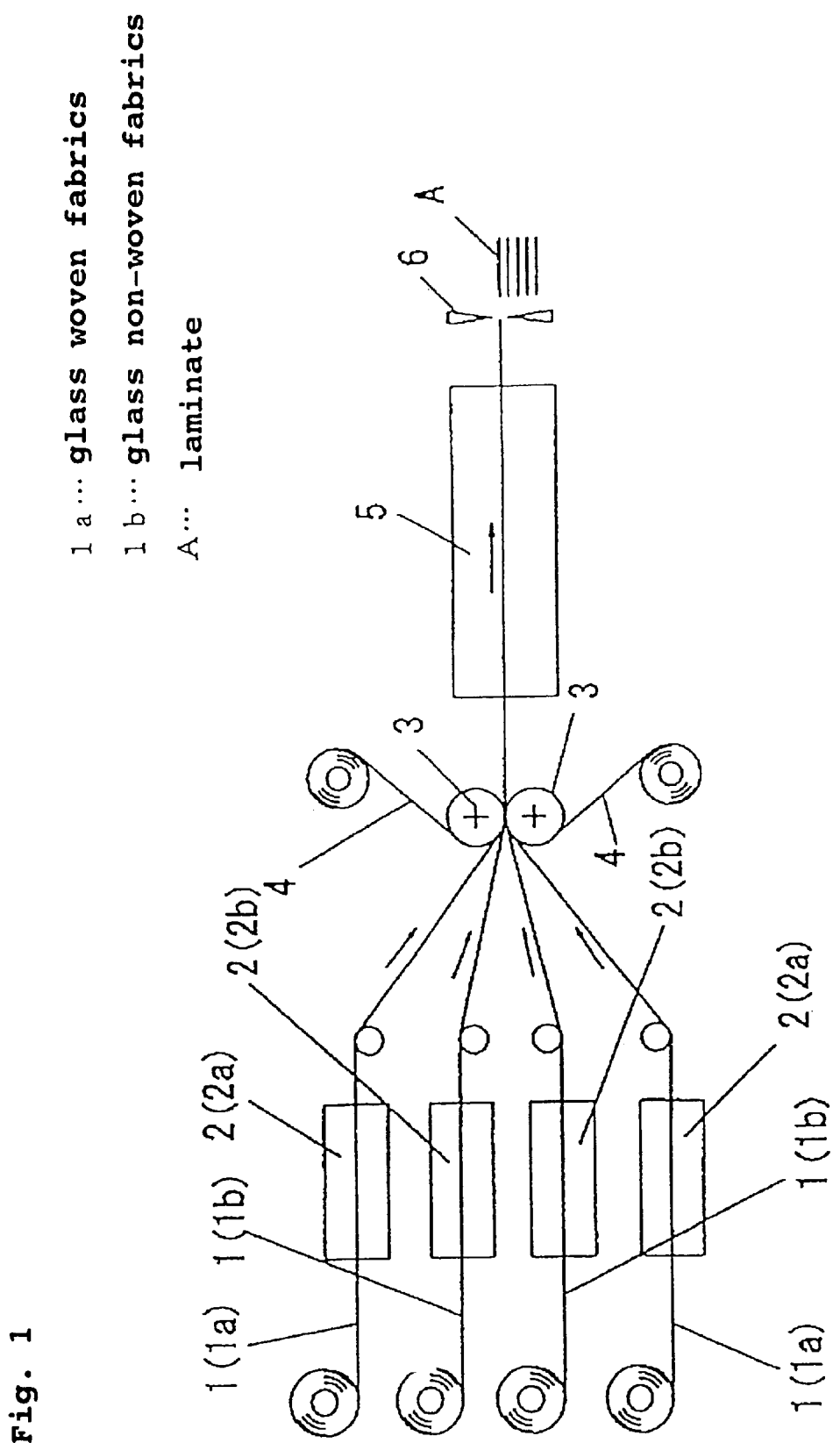

FLAME RETARDANT RESIN COMPOSITION

BACKGROUND OF THE INVENTION

1. Field of the Invention

The present invention relates to a flame retardant resin composition comprising a radically polymerizable resin modified with a phosphorus-containing compound.

2. Prior Art

In the production of laminates, a continuous production method is practically used, in which all the steps from the immersion of a substrate in a resin varnish to the shaping are continuously carried out.

FIG. 1 shows one example of such a continuous method for the production of laminates.

Firstly, each elongate substrate 1, which is wound around a respective roll is continuously unwound and passed through a resin-immersing bath 2 to impregnate the substrate 1 with a resin varnish. Then, a plurality of the substrates 1, which have been impregnated with the resin varnish, are continuously passed through rolls 3, 3. In this step, elongate metal foils 4 such as copper foils are also passed through the rolls 3, 3 while laminating them on the both sides of the laminated substrates. Thereafter, the composite of the substrates 1 and the metal foils 4 is passed through a heat curing furnace 5 to cure the resin varnish impregnated in the substrates so that the substrates 1 and the metal foils 4 are integrally laminated. The laminate is then pulled out from the furnace 5, and cut to a desired size with a cutting machine 6. Thus, laminates A are obtained.

In the case of a composite laminate such as CEM-3, glass woven fabrics 1a and glass non-woven fabrics 1b are used as substrates, and a laminate is produced by laminating the glass woven fabrics 1a impregnated with a resin varnish as outer layers, and the glass non-woven fabrics 1b impregnated with a resin varnish as inner layers.

When laminates are produced by the above-described continuous method, a resin varnish impregnated in substrates is heated and cured in a heat curing furnace without pressurization. Thus, a resin varnish comprising a radically polymerizable resin is generally used, which contains no solvent as a volatile component, or generates no water or other volatile components by the curing reaction.

Furthermore, to make a laminate flame retardant, it is necessary to incorporate a halogen atom such as a bromine atom or a chlorine atom in the backbones of a radically polymerizable resin.

However, when laminates are produced using such a radically polymerizable resin containing a halogen atom such as a bromine atom or a chlorine atom, the halogen atom is liberated from the resin on burning of the laminate to generate toxic gasses such as hydrogen bromide or hydrogen chloride gas, dioxin, etc., which may have harmful influences on human beings or the environment.

SUMMARY OF THE INVENTION

One object of the present invention is to provide a resin composition which is made flame retardant without the use of a halogen atom such as a bromine atom or a chlorine atom.

Accordingly, the present invention provides a flame retardant resin composition comprising a radically polymerizable resin which is modified with a phosphorus-containing compound of the formula (1):

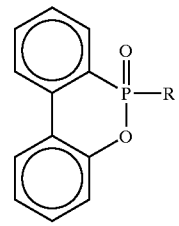

(1)

wherein R is a hydrogen atom or a group of the formula: $-(CH_2)_n-R_1$ in which $R_1$ is a group derived from a compound having at least two phenolic hydroxyl groups or epoxy groups, and n is an integer of 0 to 3.

BRIEF DESCRIPTION OF THE DRAWING

FIG. 1 schematically shows one example of a continuous method for the production of laminates using a resin composition comprising a radically polymerizable resin

DETAILED DESCRIPTION OF THE INVENTION

Examples of a radically polymerizable resin contained in the flame retardant resin composition of the present invention include unsaturated polyester resins, vinyl ester resins, urethane acrylate resins, etc.

The flame retardant resin composition of the present invention can be prepared by compounding such a radically polymerizable resin which is modified with a phosphorus-containing compound, a radically polymerizable monomer (e.g. styrene, diallyl phthalate, etc.), a radical polymerization initiator, and optional fillers.

Then, a resin varnish is formulated from the resin composition of the present invention, and substrates are dipped in the formulated resin varnish and laminated to obtain a laminate.

In a phosphorus-containing compound of the formula (1), examples of $R_1$ include groups derived from the following compounds:

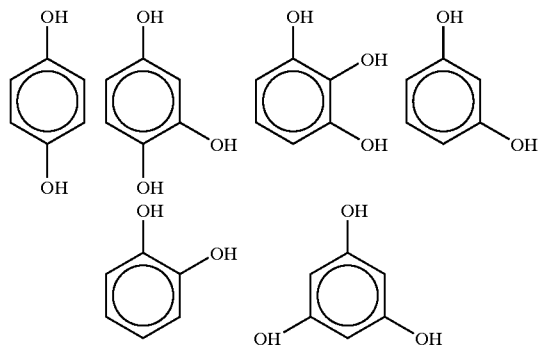

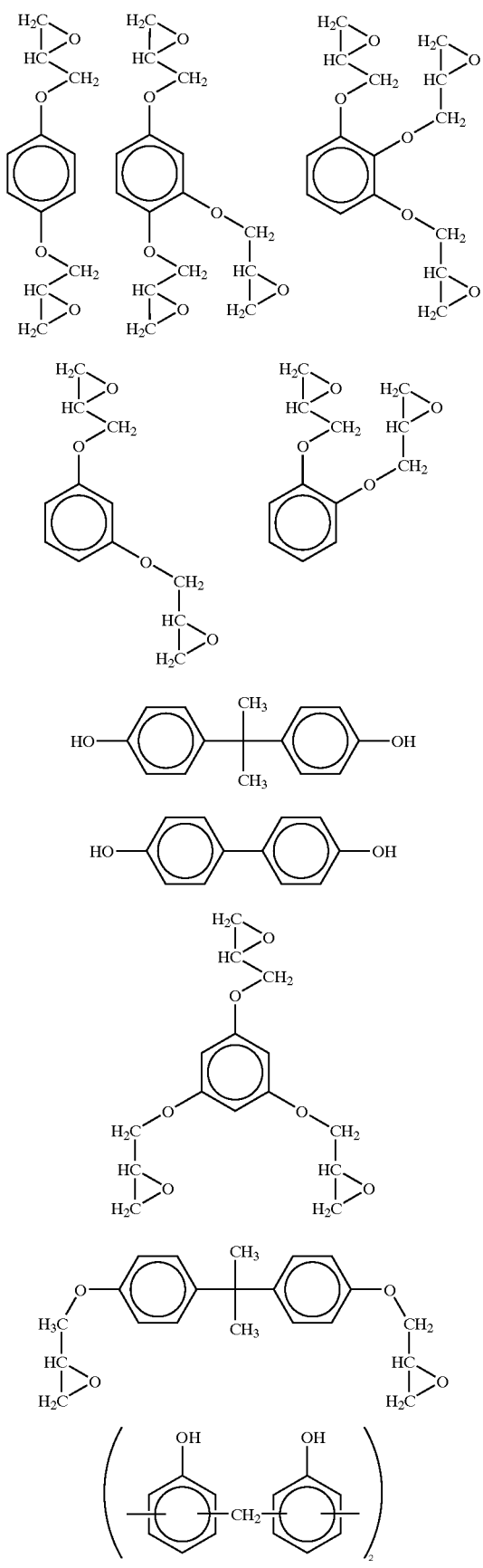
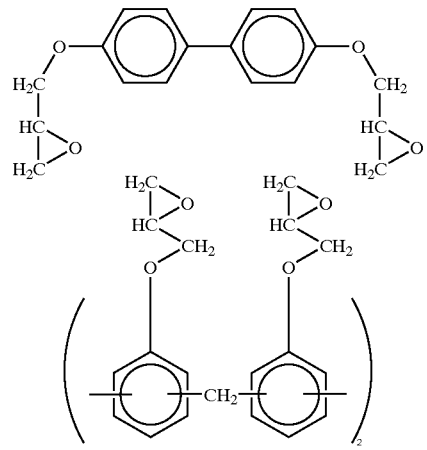
Preferred examples of the phosphorus-containing compound of the formula (1) include the compounds represented by the following formulas:
(4)
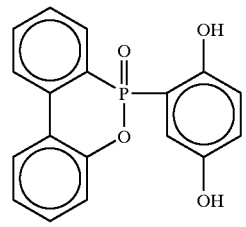
(5)
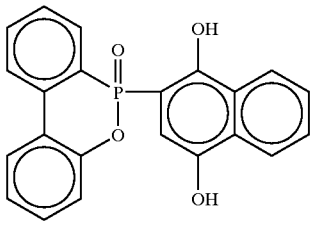
(6)
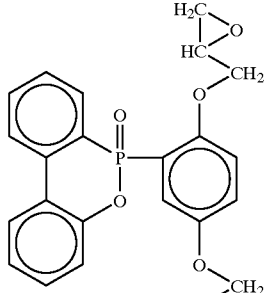
(7)
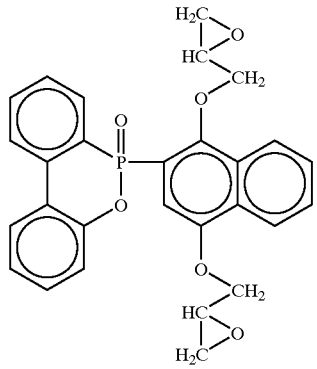

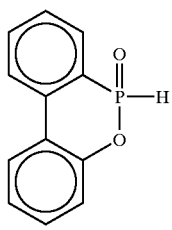

(8)

Among them, the phosphorus-containing compounds of the formulas (4) and (8) are particularly preferred.

A phosphorus-containing compound may be prepared by the reaction of phosphine oxide and benzoquinone, or the reaction of phosphine oxide and a polyfunctional phenol having an allyl group.

The amount of the phosphorus-containing compound is usually from 2 to 70 wt. parts, preferably from 4 to 30 wt. parts, per 100 wt. parts of the radically polymerizable resin.

When the amount of the phosphorus-containing compound is less than 2 wt. parts, the flame retardancy of the resin composition may not be improved. When the amount of the phosphorus-containing compound exceeds 70 wt. parts, any radically polymerizable resin composition cannot be formulated.

A radically polymerizable resin modified with a phosphorus-containing compound may be prepared by the reaction of a phosphorus-containing compound having an epoxy group and a radically polymerizable monomer having a carboxyl group (e.g. acrylic acid, methacrylic acid, etc.), the reaction of a phosphorus-containing compound having a hydroxyl group or a P—H group, an epoxy compound and a radically polymerizable monomer having a carboxyl group (e.g. acrylic acid, methacrylic acid, etc.), and so on.

The above epoxide compound, which is also referred to as a polyepoxide compound, may be a saturated or unsaturated aliphatic alicyclic aromatic or heterocyclic compound. The epoxide compound may optionally have at least one substituent which does not induce interfering side reactions under mixing or reaction conditions, for example, an alkyl group (e.g. an alkyl group having 1 to 10 carbon atoms), an aryl group (e.g. a phenyl group, a tolyl group, a xylyl group, etc.) or an ether group. A mixture of two or more different polyepoxide compounds may be used.

A number average molecular weight Mn of such a polyepoxide compound is usually up to about 9,000, preferably from about 150 to 4,000.

Polyepoxide compounds may be polyglycidyl ethers based on polyhydric alcohols, preferably a dihydric alcohols, phenols, hydrogenated products of phenols or novolak resins which are reaction products of mono- or polyhydric phenols (e.g. phenol, cresols, etc.) with aldehydes, preferably formaldehyde, and can be prepared by reacting a polyol with epichlorohydrin by any known method.

Preferred examples of polyhydric phenols include resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1'-bis(4-hydroxyphenyl)isobutane, 2,2-bis(4-hydroxy-tert.-butylphenyl)propane, bis(2-hydroxynaphthyl)methane, 1,5-dihydroxynaphthalene, tris(4-hydroxyphenyl)methane, 1,1-bis(4-hydroxyphenyl) ether, etc.

Polyglycidyl ethers of polyhydric aliphatic alcohols are also preferred as polyepoxide compounds. Preferred examples of such polyhydric alcohols include 1,4-btuanediol, 1,6-hexanediol, polyalkylene glycol, glycerol, trimethylolpropane, 2,2-bis(4-hydroxycyclohexyl)propane, pentaerithritol, etc.

Other preferred polyepoxide compounds are (poly)glycidyl esters. The (poly)glycidyl esters may be prepared by reacting epichlorohydrin or analogous epoxy compounds with aliphatic, alicyclic or aromatic polycarboxylic acids (e.g. oxalic acid, adipic acid, glutaric acid, phthalic acid, isophthalic acid, terephthalic acid, tetrahydrophthalic acid, hexahydrophthalic acid, 2,6-naphthalenedicarboxylic acid, aliphatic acid dimers, etc.). Preferred examples of such esters include diglycidyl terephtalate, diglycidyl hexahydrophthalate, etc.

Other polyepoxide compounds which can be used in the present invention are those based on heterocyclic compounds. Examples of the other polyepoxide compounds include hydantoin epoxy resins, triglycidylisocyanurate and its oligomers, triglycidyl-p-aminophenol, triglycidyl-p-aminodiphenyl ether, tetraglycidyldiaminodiphenylmethane, tetraglycidyldiaminodiphenyl ether, tetrakis(4-glycidyloxyphenyl)ethane, urazolepoxide, uracilepoxide, oxazolidinone-modified epoxy esins, etc.

Other examples of polyepoxides include those based on aromatic amines such as aniline (e.g. N,N-diglycidylaniline), diaminodiphenylmethane, N,N'-dimethylaminodiphenylmethane or N,N'-dimethylaminodiphenylsulfone, etc.

Further examples of polyepoxide compounds are described by Henry Lee and Kris Neville, "Handbood of Epoxy Resins", McGraw-Hill Book Company, 1967; Henry Lee, "Epoxy Resins", Americal Chemical Society, 1970; Wagner and Sarx, "Lackkunstharze", Carl Hanser Verla (1971), 5th edition, 174 ff.; Angew. Makromol. Chemie, Vol. 44 (1975) 151–163; DE-A-27 57 733; and EP-A-0 384 939.

The flame retardant resin composition may optionally contain a metal hydroxide, a novolak resin and/or a phosphate ester.

Examples of a metal hydroxide include aluminum hydroxide, magnesium hydroxide, etc.

A phosphate ester can be selected from aromatic condensed phosphates, triphenyl phosphate, and cresyl-di-2,6-xylenyl phosphate. Specific examples of the aromatic condense phosphates include 1,3-phenylenebis (dixylenylphosphate), 1,3-phenylenebis (diphenylphosphate), 2-propylidene-di-4,4'-1,3-phenylenebis(diphenylphosphate), 2-propylidene-di-4,4'-1,3-phenylenebis(dicresylphosphate), etc.

The amount of the metal hydroxide is usually from 1 to 400 wt. parts per 100 wt. parts of the radically polymerizable resin.

The amount of the novolak resin is from 1 to 50 wt. parts per 100 wt. parts of the radically polymerizable resin.

The amount of the phosphate ester is usually from 1 to 30 wt. parts per 100 wt. parts of the radically polymerizable resin.

Preferably, the amounts of the metal hydroxide, the novolak resin, and the phosphate ester are 30 to 200 wt. parts, 5 to 30 wt. parts, and 4 to 16 wt. parts, respectively, per 100 wt. parts of the radically polymerizable resin to attain the common properties of laminates such as the flame retardancey of "V-0".

When the amount of any one of the metal hydroxide, the novolak resin and the phosphate ester is less than the above lower limit of 30 wt. parts, 5 wt. parts and 4 wt. parts, respectively, the flame retardancy of the resin composition may not be sufficiently improved. When the amount of the metal hydroxide exceeds 200 wt. parts, the processability or heat resistance of a produced laminate may deteriorate. When the amount of the novolak resin exceeds 30 wt. parts, the adhesion properties of a produced laminate may deteriorate. When the amount of the phosphate ester exceeds 16 wt. parts, the moisture resistance and heat resistance of a produced laminate may deteriorate.

The resin composition of the present invention may contain 3 to 45 wt. parts of a compound having at least three radically polymerizable double bonds in one molecule per 100 wt. parts of a radically polymerizable resin to improve the heat resistance of the resin composition. When the amount of such a compound is less than 3 wt. parts, the heat resistance of the resin composition may not sufficiently improved. When the amount of such a compound exceeds 45 wt. parts, the degree of crosslinking of the resin becomes too high and thus the cured resin composition becomes brittle.

Preferred examples of a compound having at least three radically polymerizable double bonds in one molecule are triazine of the formula (2):

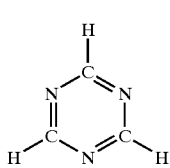

(2)

and a compound of the formula (3):

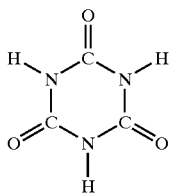

(3)

The compounds of the formulas (2) and (3) may have at least one substituent such as a trimethallyl group, an allyl group, an acryl group, an alkoxy group (e.g. an ethoxy group, a propoxy group, etc.), and the like. The compounds of the formulas (2) and (3) do not deteriorate the flame retardance of the resin composition.

Specific examples of a compound having at least three radically polymerizable double bonds in one molecule include trimethallylisocyanurate, triallylcyanurate, triallylisocyanurate, triacrylformal, ethoxylated isocyanuric acid triacrylate (CA40220-08-4), etc.

Other examples of a compound having at least three radically polymerizable double bonds in one molecule are tetramethylolmethane triacrylate, tetramethylolmethane trimethacrylate, etc.

The flame retardant resin composition of the present invention is advantageously used to produce laminates by a continuous production method of laminates, for example, the method shown in FIG. 1.

In the method of FIG. 1, a pair of elongate glass woven fabrics 1a are passed through respective resin-immersing baths 2a containing the resin composition of the present invention to impregnate the glass woven fabrics 1a with the resin composition. At the same time, a pair of glass non-woven fabrics 1b are passed through respective resin-immersing baths 2b containing the resin composition of the present invention to impregnate the glass non-woven fabrics 1b with the resin composition. Then, the impregnated woven fabrics 1a and the impregnated non-woven fabrics 1b are passed through a pair of rolls 3, 3 so that the woven fabrics 1a constitute the surface layers, while the non-woven fabrics 1b constitute the inner layers. Also, elongate metal foils 4 such as copper foils are passed through the rolls 3, 3 while laminating them on the both sides of the laminated substrates. Thereafter, the composite of the substrates 1a, 1b and the metal foils 4 is passed through a heat curing furnace 5 to cure the resin composition impregnated in the substrates so that the substrates 1a and 1b and the metal foils 4 are integrally laminated. The laminate is then pulled out from the furnace 5, and cut to a desired size with a cutting machine 6. Thus, the CEM-3 type composite laminates A are obtained.

EXAMPLES

The present invention will be illustrated by the following Examples, which do not limit the scope of the invention in any way.

Examples 1–12 and Comparative Example 1

The components and compositions used in each Example or Comparative Example are listed in Table 1.

Example 1

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (342 g), and triphenylphosphine (1 g) were charged, and stirred at 148° C. for hour. Thus, a brownish transparent liquid was obtained.

To the liquid cooled to 120° C., hydroquinone (0.2 g), methacrylic acid (95 g) and triphenylphosphine (0.6 g) were added and thoroughly reacted at 120° C. until an acid value decreased to less than 20. Furthermore, a styrene monomer (257 g), aluminum hydroxide (257 g) and magnesium hydroxide (257 g) were added and well stirred, followed by cooling to a room temperature. Then, a radical polymerization initiator ("Percumyl H80" available from NOF (Nippon Oil & Fat) Corporation) (11 g) was added to obtain a resin composition.

Example 2

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol A epoxy resin ("YD-128" available from TOHTO KASEI KABUSHIKIKAISHA) (380 g), and triphenylphosphine (1 g) were charged, and stirred at 148° C. for 1 hour. Thus, a brownish transparent liquid was obtained.

To the liquid cooled to 120° C., hydroquinone (0.2 g), methacrylic acid (95 g) and triphenylphosphine (0.6 g) were added and thoroughly reacted at 120° C. until an acid value decreased to less than 20. Furthermore, a styrene monomer (273 g), aluminum hydroxide (273 g) and magnesium hydroxide (273 g) were added and well stirred, followed by cooling to a room temperature. Then, a radical polymerization initiator ("Percumyl H80" available from NOF Corporation) (11 g) was added to obtain a resin composition.

Example 3

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (684 g), and triphenylphosphine (1 g) were charged, and stirred at 148° C. for 1 hour. Thus, a brownish transparent liquid was obtained.

To the liquid cooled to 120° C., hydroquinone (0.3 g), methacrylic acid (259 g) and triphenylphosphine (1.1 g) were added and thoroughly reacted at 120° C. until an acid value decreased to less than 20. Furthermore, a styrene monomer (368 g) and aluminum hydroxide (2508 g) were added and well stirred, followed by cooling to a room temperature. Then, a radical polymerization initiator ("Percumyl H80" available from NOF Corporation) (18 g) was added to obtain a resin composition.

Example 4

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (342 g), a bisphenol A epoxy resin ("YD-128" available from TOHTO KASEI KABUSHIKIKAISHA) (190 g), and triphenylphosphine (1 g) were charged, and stirred at 148° C. for 1 hour. Thus, a brownish transparent liquid was obtained.

To the liquid cooled to 120° C., hydroquinone (0.2 g), methacrylic acid (181 g) and triphenylphosphine (0.9 g) were added and thoroughly reacted at 120° C. until an acid value decreased to less than 20. Furthermore, a styrene monomer (292 g) and magnesium hydroxide (935 g) were added and well stirred, followed by cooling to a room temperature. Then, a radical polymerization initiator ("Percumyl H80" available from NOF Corporation) (15 g) was added to obtain a resin composition.

Example 5

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (513 g), a phenolic novolak epoxy resin ("TDPN-638P" available from TOHTO KASEI KABUSHIKIKAISHA) (181 g), and triphenylphosphine (1 g) were charged, and stirred at 148° C. for 1 hour. Thus, a brownish transparent liquid was obtained.

To the liquid cooled to 120° C., hydroquinone (0.3 g), methacrylic acid (284 g) and triphenylphosphine (1.1 g) were added and thoroughly reacted at 120° C. until an acid value decreased to less than 20. Furthermore, a styrene monomer (201 g) and aluminum hydroxide (4761 g) were added and well stirred, followed by cooling to a room temperature. Then, a radical polymerization initiator ("Percumyl H80" available from NOF Corporation) (17 g) was added to obtain a resin composition.

Example 6

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (513 g), a cresolic ovolak epoxy resin ("YDCN-704P" available from TOHTO KASEI KABUSHIKIKAISHA) (214 g), and triphenylphosphine (1 g) were charged, and stirred at 148° C. for 1 hour. Thus, a brownish transparent liquid was obtained.

To the liquid cooled to 120° C., hydroquinone (0.4 g), methacrylic acid (271 g) and triphenylphosphine (1.2 g) were added and thoroughly reacted at 120° C. until an acid value decreased to less than 20. Furthermore, a styrene monomer (774 g) and aluminum hydroxide (387 g) were added and well stirred, followed by cooling to a room temperature. Then, a radical polymerization initiator ("Percumyl H80" available from NOF Corporation) (24 g) was added to obtain a resin composition.

Example 7

In a 3 liter flask, the phosphorus-containing compound of the formula (5) which had been prepared by reacting 9,10-dihydro-9-oxa-10-phosphaphenanthrene-10-oxide with 1,4-naphthoquinone (186 g), a bisphenol F epoxy resin ("YDF-170" available from TOHTO KASEI KABUSHIKIKAISHA) (684 g), and triphenylphosphine (1 g) were charged, and stirred at 148° C. for 1 hour. Thus, a brownish transparent liquid was obtained.

To the liquid cooled to 120° C., hydroquinone (0.3 g), methacrylic acid (284 g) and triphenylphosphine (1.2 g) were added and thoroughly reacted at 120° C. until an acid value decreased to less than 20. Furthermore, a styrene monomer (385 g) and aluminum hydroxide (1233 g) were added and well stirred, followed by cooling to a room temperature. Then, a radical polymerization initiator ("Percumyl H80" available from NOF Corporation) (19 g) was added to obtain a resin composition.

Example 8

In a 3 liter flask, the phosphorus-containing compound of the formula (6) which had been prepared by reacting the compound of the formula (4) and epichlorohydrin (436 g), hydroquinone (0.2 g), methacrylic acid (181 g) and triphenylphosphine (0.6 g) were added and thoroughly reacted at 120° C. until an acid value decreased to less than 20. Furthermore, a styrene monomer (264 g) and aluminum hydroxide (353 g) were added and well stirred, followed by cooling to a room temperature. Then, a radical polymerization initiator ("Percumyl H80" available from NOF Corporation) (11 g) was added to obtain a resin composition.

Example 9

In a 3 liter flask, the phosphorus-containing compound of the formula (7) which had been prepared by reacting the compound of the formula (5) and epichlorohydrin (486 g), hydroquinone (0.2 g), methacrylic acid (181 g) and triphenylphosphine (0.7 g) were added and thoroughly reacted at 120° C. until an acid value decreased to less than 20. Furthermore, a styrene monomer (118 g) was added and well stirred, followed by cooling to a room temperature. Then, a radical polymerization initiator ("Percumyl H80" available from NOF Corporation) (10 g) was added to obtain a resin composition.

Example 10

In a 3 liter flask, the phosphorus-containing compound of the formula (4), namely 10-(2,5-dihydroxyphenyl)-10H-9- oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (684 g), and triphenylphosphine (1 g) were charged, and stirred at 148° C. for 1 hour. Thus, a brownish transparent liquid was obtained.

To the liquid cooled to 120° C., hydroquinone (0.3 g), methacrylic acid (227 g) and triphenylphosphine (0.8 g) were added and thoroughly reacted at 120° C. until an acid value decreased to less than 20. Furthermore, a styrene monomer (358 g) and magnesium hydroxide (1863 g) were added and well stirred, followed by cooling to a room temperature. Then, a radical polymerization initiator ("Percumyl H80" available from NOF Corporation) (18 g) was added to obtain a resin composition.

Example 11

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a bisphenol F epoxy resin ("YDF-170" available from TOHTO KASEI KABUSHIKIKAISHA) (676 g), and triphenylphosphine (1 g) were charged, and stirred at 148° C. for 1 hour. Thus, a brownish transparent liquid was obtained. To the liquid cooled to 120° C., hydroquinone (0.5 g), methacrylic acid (270 g) and triphenylphosphine (1 g) were added and thoroughly reacted at 120° C. until an acid value decreased to less than 20.

Separately, in a 3 liter flask, the phosphorus-containing compound of the formula (8), namely 9,10-dihydro-9-oxa-10-phosphaphenanthrene-10-oxide ("HCA" available from SANKO KABUSHIKIKAISHA) (82 g), a phenolic novolak epoxy resin ("YDPN-638P" available from TOHTO KASEI KABUSHIKIKAISHA) (170 g), and triphenylphosphine (0.3 g) were charged, and stirred at 148° C. for 1 hour. Thus, a brownish transparent liquid was obtained. To the liquid cooled to 120° C., hydroquinone (0.4 g), methacrylic acid (48 g) and triphenylphosphine (0.3 g) were added and thoroughly reacted at 120° C. until an acid value decreased to less than 20.

To the mixture of the above two liquids, cresil 2,6-xylenyl phosphate ("PX-110" available from DAIHACHI KAGAKU KABUSHIKIKAISHA) (101 g), a styrene monomer (615 g) and aluminum hydroxide (1623 g) were added and well stirred, followed by cooling to a room temperature. Then, a radical polymerization initiator ("Percumyl H80" available from NOF Corporation) (20 g) was added to obtain a resin composition.

Example 12

In a 3 liter flask, the phosphorus-containing compound of the formula (4), namely 10-(2,5-dihydroxyphenyl)-10H-9-oxa-10-phosphaphenanthrene-10-oxide ("HCA-HQ" available from SANKO KABUSHIKIKAISHA) (162 g), a phenolic novolak epoxy resin ("YDPN-638P" available from TOHTO KASEI KABUSHIKIKAISHA) (729 g), a bisphenol A epoxy resin ("YD-128" available from TOHTO KASEI KABUSHIKIKAISHA) (381 g), and triphenylphosphine (2 g) were charged, and stirred at 148° C. for 1 hour. Thus, a brownish transparent liquid was obtained.

To the liquid cooled to 120° C., hydroquinone (1.2 g), methacrylic acid (460 g) and triphenylphosphine (1.5 g) were added and thoroughly reacted at 120° C. until an acid value decreased to less than 20. Furthermore, cresil 2,6-xylenyl phosphate ("PX-110" available from DAIHACHI KAGAKU KABUSHIKIKAISHA) (471 g), a styrene monomer (879 g) and aluminum hydroxide (4323 g) were added and well stirred, followed by cooling to a room temperature. Then, a radical polymerization initiator ("Percumyl H80" available from NOF Corporation) (28 g) was added to obtain a resin composition.

Example 13

In a 3 liter flask, the phosphorus-containing compound of the formula (8), namely 9,10-dihydro-9-oxa-10-phosphaphenanthrene-10-oxide ("HCA" available from SANKO KABUSHIKIKAISHA) (259 g), a phenol novolak epoxy resin ("YDPN-638P" available from TOHTO KASEI KABUSHIKIKAISHA) (543 g), and triphenylphosphine (1.6 g) were charged, and stirred at 148° C. for 1 hour. Thus, a brownish transparent liquid was obtained.

To the liquid cooled to 120° C., hydroquinone (0.7 g), methacrylic acid (155 g) and triphenylphosphine (1.0 g) were added and thoroughly reacted at 120° C. until an acid value decreased to less than 20. Furthermore, cresil 2,6-xylenyl phosphate ("PX-110" available from DAIHACHI KAGAKU KABUSHIKIKAISHA) (300 g), a styrene monomer (515 g) and aluminum hydroxide (3545 g) were added and well stirred, followed by cooling to a room temperature. Then, a radical polymerization initiator ("Percumyl H80" available from NOF Corporation) (18 g) was added to obtain a resin composition.

Example 14

In a 3 liter flask, the phosphorus-containing compound of the formula (8), namely 9,10-dihydro-9-oxa-10-phosphaphenanthrene-10-oxide ("HCA" available from SANKO KABUSHIKIKAISHA) (173 g), a phenol novolak epoxy resin ("YDPN-638P" available from TOHTO KASEI KABUSHIKIKAISHA) (362 g), and triphenylphosphine (1.1 g) were charged, and stirred at 148° C. for 1 hour. Thus, a brownish transparent liquid was obtained.

To the liquid cooled to 120° C., hydroquinone (0.5 g), methacrylic acid (103 g) and triphenylphosphine (0.6 g) were added and thoroughly reacted at 120° C. until an acid value decreased to less than 20. Furthermore, cresil 2,6-xylenyl phosphate ("PX-110" available from DAIHACHI KAGAKU KABUSHIKIKAISHA) (230 g), a styrene monomer (344 g), ethoxylated isocyanuric acid triacrylate (654 g) and aluminum hydroxide (2613 g) were added and well stirred, followed by cooling to a room temperature. Then, a radical polymerization initiator ("Percumyl H80" available from NOF Corporation) (20 g) was added to obtain a resin composition.

Example 15

In a 3 liter flask, the phosphorus-containing compound of the formula (8), namely 9,10-dihydro-9-oxa-10-phosphaphenanthrene-10-oxide ("HCA" available from SANKO KABUSHIKIKAISHA) (173 g), a phenol novolak epoxy resin ("YDPN-638P" available from TOHTO KASEI KABUSHIKIKAISHA) (362 g), and triphenylphosphine (1.1 g) were charged, and stirred at 148° C. for 1 hour. Thus, a brownish transparent liquid was obtained.

To the liquid cooled to 120° C., hydroquinone (0.5 g), methacrylic acid (103 g) and triphenylphosphine (0.6 g) were added and thoroughly reacted at 120° C. until an acid value decreased to less than 20. Furthermore, cresil 2,6-xylenyl phosphate ("PX-110" available from DAIHACHI KAGAKU KABUSHIKIKAISHA) (230 g), a styrene monomer (344 g), triallylisocyanurate (52 g) and aluminum hydroxide (1769 g) were added and well stirred, followed by cooling to a room temperature. Then, a radical polymerization initiator ("Percumyl H80" available from NOF Corporation) (13 g) was added to obtain a resin composition.

Example 16

In a 3 liter flask, the phosphorus-containing compound of the formula (8), namely 9,10-dihydro-9-oxa-10-phosphaphenanthrene-10-oxide ("HCA" available from SANKO KABUSHIKIKAISHA) (173 g), a phenol novolak epoxy resin ("YDPN-638P" available from TOHTO KASEI KABUSHIKIKAISHA) (362 g), and triphenylphosphine (1.1 g) were charged, and stirred at 148° C. for 1 hour. Thus, a brownish transparent liquid was obtained.

To the liquid cooled to 120° C., hydroquinone (0.5 g), methacrylic acid (103 g) and triphenylphosphine (0.6 g) were added and thoroughly reacted at 120° C. until an acid value decreased to less than 20. Furthermore, cresil 2,6-xylenyl phosphate ("PX-110" available from DAIHACHI KAGAKU KABUSHIKIKAISHA) (185 g), a styrene monomer (344 g), tetramethylolmethane trimethacrylate ("TMM360" available from SHIN-NAKAMURA KAGAKU KABUSHIKIKAISHA) (140 g) and aluminum hydroxide (1830 g) were added and well stirred, followed by cooling to a room temperature. Then, a radical polymerization initiator ("Percumyl H80" available from NOF Corporation) (14 g) was added to obtain a resin composition.

Example 17

In a 3 liter flask, the phosphorus-containing compound of the formula (8), namely 9,10-dihydro-9-oxa-10-phosphaphenanthrene-10-oxide ("HCA" available from SANKO KABUSHIKIKAISHA) (216 g), a bisphenol A epoxy resin ("YD-128" available from TOHTO KASEI KABUSHIKIKAISHA) (380 g), and triphenylphosphine (1.2 g) were charged, and stirred at 148° C. for 1 hour. Thus, a brownish transparent liquid was obtained.

To the liquid cooled to 120° C., hydroquinone (0.3 g), methacrylic acid (86 g) and triphenylphosphine (0.3 g) were added and thoroughly reacted at 120° C. until an acid value decreased to less than 20. Furthermore, cresil 2,6-xylenyl phosphate ("PX-110" available from DAIHACHI KAGAKU KABUSHIKIKAISHA) (250 g), a styrene monomer (367 g), ethoxylated isocyanuric acid triacrylate (450 g) and aluminum hydroxide (3148 g) were added and well stirred, followed by cooling to a room temperature. Then, a radical polymerization initiator ("Percumyl H80" available from NOF Corporation) (19 g) was added to obtain a resin composition.

Comparative Example

In a 3 liter flask, a bisphenol A epoxy resin ("YD-128" available from TOHTO KASEI KABUSHIKIKAISHA) (380 g), hydroquinone (0.2 g), methacrylic acid (189 g) and triphenylphosphine (0.6 g) were added and thoroughly reacted at 120° C. until an acid value decreased to less than 20. Furthermore, a styrene monomer (244 g), aluminum hydroxide (244 g) and magnesium hydroxide (244 g) were added and well stirred, followed by cooling to a room temperature. Then, a radical polymerization initiator ("Percumyl H80" available from NOF Corporation) (10 g) was added to obtain a resin composition.

EVALUATION

The resin composition obtained in each of Examples 1–12 and Comparative Example was poured in a mold having an inner size of 100 mm×150 mm×2 mm, heated at 110° C. for 30 minutes, and then post-cured at 180° C. for 30 minutes. Thus, a plate-form cured product was obtained.

With the uncured resin composition, two plain-woven glass fabrics each having a thickness of 200 $\mu$m and a size of 300 mm×300 mm, and two glass paper sheets each having a unit weight of 51 g/m$^2$, a density of 0.14 g/cm$^3$ and a size of 300 mm×300 mm were impregnated. Then, they were laminated so that the plain-woven fabrics constituted the surface layers, while the two glass paper sheets constituted the inner layers. Furthermore, a pair of copper foils were laminated on the both sides of the laminated composite.

Then, the laminated product was placed between a pair of metal plates, and heated at 110° C. for 30 minutes, and post-cured at 180° C. for 30 minutes to obtain a coppered lamiante having a thickness of 1.6 mm.

A test piece having a length of 125 mm and a width of 13 mm was cut out from each of the laminate from which the copper foils were removed by etching, and the plate-form cured product.

The test piece was subjected to the flammability test according to Underwriters Laboratories "Test for Flammability of Plastic Materials-UL94".

The results are shown in Table 1.

TABLE 1

|  | Ex. 1 | Ex. 2 | Ex. 3 | Ex. 4 | Ex. 5 | Ex. 6 | Ex. 7 |
|---|---|---|---|---|---|---|---|
| Compound (4) (g) | 162 | 162 | 162 | 162 | 162 | 162 |  |
| Compound (5) (g) |  |  |  |  |  |  | 186 |
| Compound (6) (g) |  |  |  |  |  |  |  |
| Compound (7) (g) |  |  |  |  |  |  |  |
| Compound (8) (g) |  |  |  |  |  |  |  |
| Bisphenol F epoxy resin (g) | 342 |  | 684 | 342 | 513 | 513 | 684 |
| Bisphenol A epoxy resin (g) |  | 380 |  | 190 |  |  |  |
| Phenol novolak epoxy resin (g) |  |  |  |  |  | 181 |  |
| Cresol novolak epoxy resin (g) |  |  |  |  |  |  | 214 |
| Triphenylphosphine (g) | 1 | 1 | 1 | 1 | 1 | 1 | 1 |
| Methacrylic acid (g) | 95 | 95 | 259 | 181 | 284 | 271 | 284 |
| Acrylic acid (g) |  |  |  |  |  |  |  |

TABLE 1-continued

| | | | | | | | |
|---|---|---|---|---|---|---|---|
| Styrene (g) | 257 | 273 | 368 | 292 | 201 | 774 | 385 |
| Ethoxylated isocyanuric acid triacrylate (g) | | | | | | | |
| Triallyl isocyanurate (g) | | | | | | | |
| Tetramethylolmethane trimethacrylate (g) | | | | | | | |
| Hydroquinone (g) | 0.2 | 0.2 | 0.3 | 0.2 | 0.3 | 0.4 | 0.3 |
| Triphenylphosphine (g) | 0.6 | 0.6 | 1.1 | 0.9 | 1.1 | 1.2 | 1.2 |
| Percumyl H80 (g) | 11 | 11 | 18 | 15 | 17 | 24 | 19 |
| Al(OH)$_3$ (g) | 257 | 273 | 2508 | | 4761 | 387 | 1233 |
| Mg(OH)$_2$ (g) | 257 | 273 | | 935 | | | |
| Phospate ester (g) | | | | | 13.5 | 11.1 | |
| Novolak resin (wt. %) | | | | | | | |
| Hydroxide (wt. %) | 60 | 60 | 170 | 80 | 355 | 20 | 80 |
| Phosphate ester (wt. %) | | | | | | | |
| Compound (4)–(8) (wt. %) | 18.7 | 17.6 | 10.8 | 13.7 | 11.9 | 8.3 | 11.9 |
| Compound having radically polymerizable double bond (wt. %) | | | | | | | |
| Flammability evaluation | V-1–V-0 | V-1–V-0 | V-1–V-0 | V-1–V-0 | V-0 | V-1–V-0 | V-1–V-0 |

| | Ex. 8 | Ex. 9 | Ex. 10 | Ex. 11 | Ex. 12 | Ex. 13 |
|---|---|---|---|---|---|---|
| Compound (4) (g) | | | 162 | 162 | 162 | |
| Compound (5) (g) | | | | | | |
| Compound (6) (g) | 436 | | | | | |
| Compound (7) (g) | | 486 | | | | |
| Compound (8) (g) | | | | 82 | | 259 |
| Bisphenol F epoxy resin (g) | | | 684 | 676 | | |
| Bisphenol A epoxy resin (g) | | | | | 381 | |
| Phenol novolak epoxy resin (g) | | | 170 | 729 | 543 | |
| Cresol novolak epoxy resin (g) | | | | | | |
| Triphenylphosphine (g) | | | 1 | 1.3 | 2 | 1.6 |
| Methacrylic acid (g) | 181 | 181 | 227 | 318 | 460 | 155 |
| Acrylic acid (g) | | | | | | |
| Styrene (g) | 264 | 118 | 358 | 615 | 879 | 515 |
| Ethoxylated isocyanuric acid triacrylate (g) | | | | | | |
| Triallyl isocyanurate (g) | | | | | | |
| Tetramethylolmethane trimethacrylate (g) | | | | | | |
| Hydroquinone (g) | 0.2 | 0.2 | 0.3 | 0.9 | 1.2 | 0.7 |
| Triphenylphosphine (g) | 0.6 | 0.7 | 0.8 | 1.3 | 1.5 | 1.0 |
| Percumyl H80 (g) | 11 | 10 | 18 | 20 | 28 | 18 |
| Al(OH)$_3$ (g) | 353 | 0 | | 1623 | 4323 | 3545 |
| Mg(OH)$_2$ (g) | | | 1863 | | | |
| Phospate ester (g) | | | | 101 | 471 | 300 |
| Novolak resin (wt. %) | | | | 7.8 | 23.6 | 30.6 |
| Hydroxide (wt. %) | 40 | 0 | 130 | 76 | 140 | 200 |
| Phosphate ester (wt. %) | | | | 4.8 | 15.3 | 16.9 |
| Compound (4)–(8) (wt. %) | 4.8.8 | 61.1 | 11.2 | 11.4 | 5.3 | 14.6 |
| Compound having radically polymerizable double bond (wt. %) | | | | | | |
| Flammability | V-0 | V-0 | V-1–V-0 | V-0 | V-0 | V-0 |

| | Ex. 14 | Ex. 15 | Ex. 16 | Ex. 17 | C. Ex. |
|---|---|---|---|---|---|
| Compound (4) (g) | | | | | |
| Compound (5) (g) | | | | | |
| Compound (6) (g) | | | | | |
| Compound (7) (g) | | | | | |
| Compound (8) (g) | 173 | 173 | 173 | 216 | |
| Bisphenol F epoxy resin (g) | | | | | |

TABLE 1-continued

| | | | | | |
|---|---|---|---|---|---|
| Bisphenol A epoxy resin (g) | | | | 380 | 380 |
| Phenol novolak epoxy resin (g) | 362 | 362 | 362 | | |
| Cresol novolak epoxy resin (g) | | | | | |
| Triphenylphosphine (g) | 1.1 | 1.1 | 1.1 | 1.2 | |
| Methacrylic acid (g) | 103 | 103 | 103 | 86 | 189 |
| Acrylic acid (g) | | | | | |
| Styrene (g) | 344 | 344 | 344 | 367 | 244 |
| Ethoxylated isocyanuric acid triacrylate (g) | 654 | | | 450 | |
| Triallyl isocyanurate (g) | | 52 | | | |
| Tetramethylolmethane trimethacrylate (g) | | | 140 | | |
| Hydroquinone (g) | 0.5 | 0.5 | 0.5 | 0.3 | 0.2 |
| Triphenylphosphine (g) | 0.6 | 0.6 | 0.6 | 0.3 | 0.6 |
| Percumyl H80 (g) | 20 | 13 | 14 | 19 | 10 |
| Al(OH)$_3$ (g) | 2613 | 1769 | 1830 | 3148 | 244 |
| Mg(OH)$_2$ (g) | | | | | 244 |
| Phospate ester (g) | 230 | 230 | 185 | 250 | |
| Novolak resin (wt. %) | 19.4 | 28.5 | 27.7 | 0.0 | |
| Hydroxide (wt. %) | 140 | 140 | 140 | 180 | 60 |
| Phosphate ester (wt. %) | 12.3 | 18.2 | 14.1 | 18.2 | |
| Compound (4)–(8) (wt. %) | 9.2 | 13.7 | 13.2 | 12.3 | 0.0 |
| Compound having radically polymerizable double bond (wt. %) | 39.9 | 5.0 | 12.5 | 30.0 | |
| Flammability | V-0 | V-0 | V-0–V-1 | V-0 | Completely burnt |

The test pieces produced using the resin compositions of Examples according to the present invention were in the rank of V-1 to V-0 in the flammability test, while the test piece produced using the resin composition of Comparative Example was completely burnt out.

What is claimed is:

1. A flame retardant resin composition comprising a free radical polymerizable monomer which is prepared in the presence of an effective amount for flame-proofing of a phosphorous-containing reactant, wherein said reactant is a compound of the formula (1):

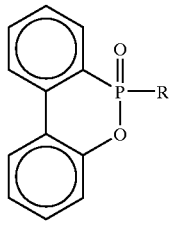

(1)

wherein R is a group of the formula:

—(CH$_2$)$_n$—R$_1$ in which n is an integer of 0 to 3, and R$_1$ is derived from one of the following compounds:

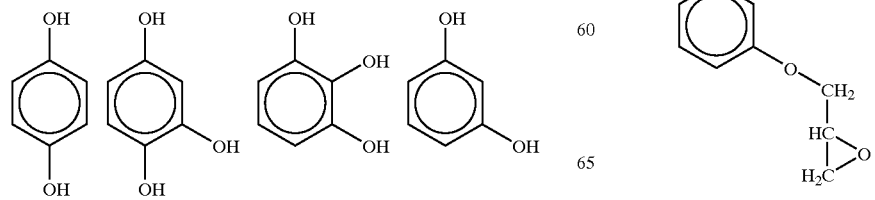

-continued

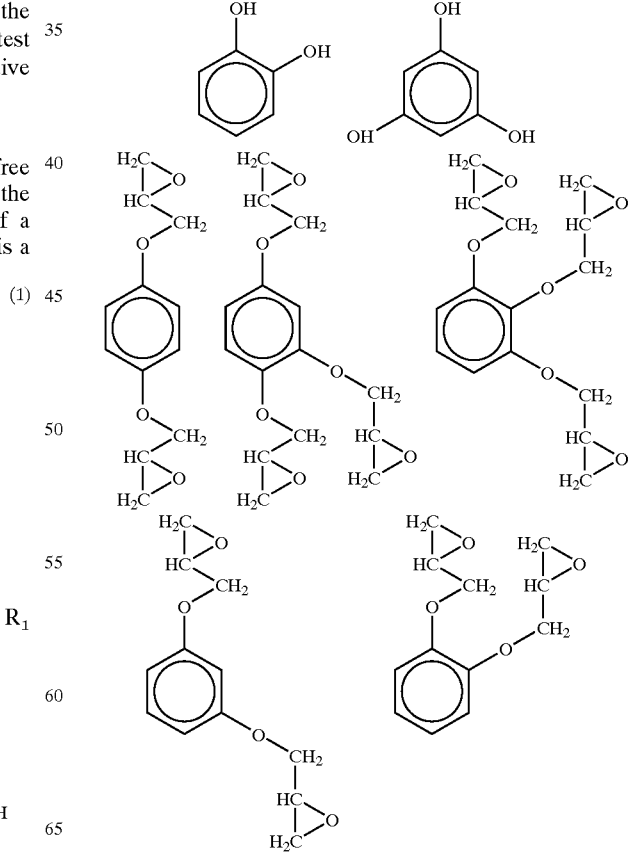

-continued

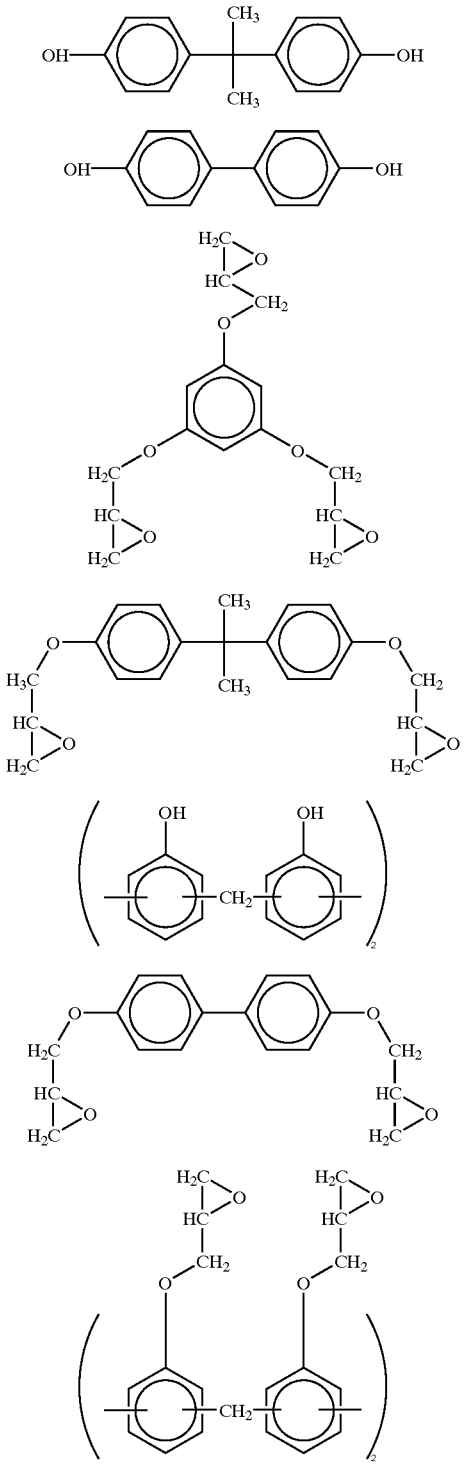

2. The flame retardant resin composition according to claim 1, wherein the amount of said phosphorus-containing compound of the formula (1) is from 2 to 70 parts by weight per 100 parts by weight of the resin.

3. The flame retardant resin composition according to claim 1, which further comprises a metal hydroxide in an amount of 1 to 400 parts by weight per 100 parts by weight of the resin.

4. The flame retardant resin composition according to claim 1, which further comprises a novolak resin in an amount of 1 to 50 parts by weight per 100 parts by weight of the resin.

5. The flame retardant resin composition according to claim 1, which further comprises a phosphate ester in an amount of 1 to 30 parts by weight per 100 parts by weight of the resin.

6. The flame retardant resin composition according to claim 1, wherein said phosphorus-containing compound is a compound of the formula (4):

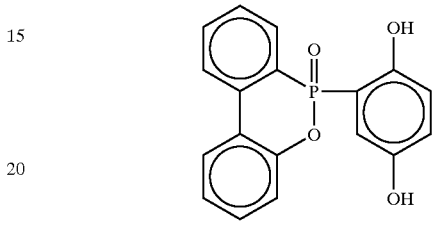

(4)

7. The flame retardant resin composition according to claim 3, wherein the metal hydroxide is aluminum hydroxide or magnesium hydroxide.

8. The flame retardant resin composition according to claim 4, wherein the novolak resin is a reaction product of an aldehyde and a polyhydric phenol selected from the group consisting of resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1'-bis(4-hydroxyphenyl)isobutane, 2,2-bis(4-hydroxy-tert-butylphenyl)propane, bis(2-hydroxynaphthyl)methane, 1,5-dihydroxynaphthalene, tris(4-hydroxyphenyl)methane, 1,5-dihydroxynaphthalene, tris(4-hydroxyphenyl)methane, and 1,1'-bis(4-hydroxyphenyl)ether.

9. The flame retardant resin composition according to claim 5, wherein the phosphate ester is selected from the group consisting of triphenyl phosphate, cresyl phosphate, 1,3-phenylenebis(dixylenylphosphate), 1,3-phenylenebis(diphenylphosphate), 2-propylidene-di-4,4'-1,3-phenylenebis(diphenylphosphate) and 2-propylidene-di-4,4'-1,3-phenylenebis(dicresylphosphate).

10. The flame retardant resin composition according to claim 1, which further comprises a compound having at least three radically polymerizable double bonds in an amount of 3 to 45 parts by weight per 100 parts by weight of the radically polymerizable resin.

11. The flame retardant resin composition according to claim 10, wherein the compound having at least three radically polymerizable double bonds is one of compounds (2) or (3):

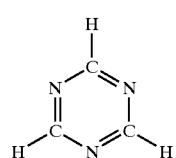

(2)

(3) 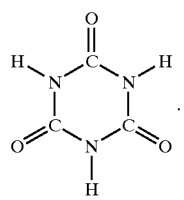

12. The flame retardant resin composition according to claim 10, wherein the compound having at least three radically polymerizable double bonds is selected from the group consisting of trimethallylisocyanurate, triallylcyanurate, triallylisocyanurate, triacrylformal, ethoxylated isocyanuric acid triacrylate, tetramethylolmethane triacrylate, tetramethylolmethane and trimethacrylate.

* * * * *